United States Patent Office.

HENRY BROWNING, OF NO. 77 SALMON LANE, LIMEHOUSE, ENGLAND.

*Letters Patent No. 102,911, dated May 10, 1870; patented in England, June 1, 1869.*

IMPROVEMENT IN COMPOSITION FOR VARNISHES, &c.

The Schedule referred to in these Letters Patent and making part of the same.

*To all whom it may concern:*

Be it known that I, HENRY BROWNING, of No. 77 Salmon Lane, Limehouse, in the county of Middlesex, England, a subject of the Queen of Great Britain, have invented or discovered new and useful "Improvements in Compositions Suitable for use as Varnish or Paint;" and I, the said HENRY BROWNING, do hereby declare the nature of the said invention, and in what manner the same is to be performed, to be particularly described and ascertained in and by the following statement thereof; that is to say—

According to my invention I prepare a solution which may be used either mixed with "ground color" as a "paint," or by itself as a "varnish" or preservative solution, and in either form is equally applicable to stone-work, wood-work, or iron.

The ingredients are, a gum-resin, by preference, "gum-dammar," spirit, and sugar of lead, to which may be added, especially for stone-work, a little wax and corrosive sublimate. The spirit preferred is any one of the various rectified spirits of coal-tar or petroleum, such as benzine and benzoline, now so largely manufactured.

In the mixing of the ingredients considerable latitude may be allowed, and the proportions must be varied at the discretion of the manufacturer, according to the nature and position of the surface to be protected, and of the appearance and effect desired.

The gum requires to be melted by heat, the equable heat of steam being preferred, and, while warm, a sufficient quantity of spirit should be mixed with it to prevent it returning to a solid state.

The quantity of spirit required for this purpose will vary slightly, according to the quality of the gum and the temperature of the atmosphere.

The sugar of lead is ground with linseed-oil to bring it to the consistency of cream, or, if the composition is to be used for stone-work, to a paste, and is then stirred in with the solution of gum-resin.

For the preservation of stone-work from the action of damp steam, smoke, soot, gas, &c., the following would be a suitable mixture: gum, ten pounds, by weight; wax, two pounds, by weight; sugar of lead, two pounds, by weight; corrosive sublimate, one-half ounce, by weight; spirit, eighty-six pounds, by weight.

As a varnish for wood or metal, the above solution would also be found suitable with any modification that special circumstances might call for.

To be mixed with "ground color" and used as a paint, the above solution may be considerably varied. If a very fine decorative effect is desired, it will be well to use three different qualities for the first, second, and third coats. For the first coat the wax and corrosive sublimate may be left out and the quantity of the gum halved. For the second the ten parts of gum may be restored. For the third, eighteen to forty pounds, or even a larger proportion of gum may be used, three or four pounds of sugar of lead, and one-half ounce of corrosive sublimate.

For external work, one-half ounce of wax will be found a useful addition. In every case the "ground color" alluded to is intended to be the ordinary "ground color" of commerce, being pigments of any desired shade ground in raw linseed-oil.

The enamel solution thus replaces the "boiled oil" and "turpentine" in ordinary paint.

Having thus described the nature of my invention, and the manner of performing the same, I would have it understood that

What I claim is—

The composition varnish, consisting of gum-dammar, spirit, and sugar of lead, prepared in the manner and of the proportions hereinbefore specified.

Also, the composition varnish, composed of gum-dammar, spirit, sugar of lead, wax, and corrosive sublimate, prepared in the manner and of the proportions hereinbefore specified.

Also, the composition paint, consisting of a ground color and a solution of gum-dammar, spirit, and sugar of lead, prepared in the manner and of the proportions hereinbefore specified.

Also, the composition paint, composed of ground color, gum-dammar, spirit, sugar of lead, and corrosive sublimate, prepared in the manner and of the proportions hereinbefore specified.

Also, the composition paint or varnish for stone-work, composed of gum-dammar, spirit, wax, and corrosive sublimate, prepared in the manner and of the proportions hereinbefore specified.

HY. BROWNING.

Witnesses:
G. F. WARREN,
T. LAKE.
*Both of No. 17 Grace-church Street, London.*